(12) United States Patent
von Behren et al.

(10) Patent No.: US 9,691,055 B2
(45) Date of Patent: Jun. 27, 2017

(54) DIGITAL WALLET

(75) Inventors: Rob von Behren, Berkeley, CA (US); Jonathan Wall, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/277,182

(22) Filed: Oct. 19, 2011

(65) Prior Publication Data

US 2012/0158584 A1 Jun. 21, 2012

Related U.S. Application Data

(60) Provisional application No. 61/424,611, filed on Dec. 17, 2010.

(51) Int. Cl.
*G06Q 20/00* (2012.01)
*G06Q 20/10* (2012.01)
(Continued)

(52) U.S. Cl.
CPC ......... *G06Q 20/10* (2013.01); *G06Q 20/0453* (2013.01); *G06Q 20/105* (2013.01); *G06Q 20/209* (2013.01); *G06Q 20/363* (2013.01)

(58) Field of Classification Search
USPC ..... 705/65, 16, 21, 59, 71; 380/44, 262, 278
See application file for complete search history.

(56) References Cited

U.S. PATENT DOCUMENTS 4,851,653 A 7/1989 Limisaque et al.
5,221,838 A 6/1993 Gutman et al.
(Continued)

FOREIGN PATENT DOCUMENTS

EP 0924667 A2 6/1999
KR 10-2005-0088517 9/2005
(Continued)

OTHER PUBLICATIONS

Cellfire, online, retrieved from the Internet <URL:http://www.cellfire.com/whatiscf.php>originally retrieved Sep. 20, 2010, pp. 1, Jul. 25, 2012.
(Continued)

*Primary Examiner* — Dante Ravetti
(74) *Attorney, Agent, or Firm* — Johnson, Marcou & Isaacs, LLC

(57) ABSTRACT

A digital wallet that facilitates fast, convenient, and secure commerce using a mobile electronic device (or non-mobile electronic device) and stores information associated with transactions, such as purchase confirmations and receipts. The digital wallet can store information for use in transactions, including information associated with one or more financial accounts, user information, and shipping information. To complete an online purchase, the digital wallet can interact with a merchant's website to obtain information regarding the purchase. The digital wallet provides a user interface for the user to review and confirm the purchase information. The user interface also allows the user to select from multiple payment options, customize shipping information, or provide information requested by the merchant. The digital wallet can transmit user confirmation to the merchant's website and receive a receipt for the purchase. The digital wallet can store the receipt and synchronize the receipt with a remote storage location.

24 Claims, 5 Drawing Sheets

US 9,691,055 B2

Page 2

(51) Int. Cl.
*G06Q 20/04* (2012.01)
*G06Q 20/36* (2012.01)
*G06Q 20/20* (2012.01)

(56) References Cited

U.S. PATENT DOCUMENTS

| | | | |
|---|---|---|---|
| 5,371,797 A | 12/1994 | Bocinsky, Jr. | |
| 5,590,197 A | 12/1996 | Chen et al. | |
| 5,815,657 A | 9/1998 | Williams et al. | |
| 5,819,084 A | 10/1998 | Shapiro et al. | |
| 5,991,399 A | 11/1999 | Graunke et al. | |
| 6,005,942 A | 12/1999 | Chan et al. | |
| 6,092,201 A | 7/2000 | Turnbull et al. | |
| 6,101,482 A | 8/2000 | DiAngelo et al. | |
| 6,125,352 A | 9/2000 | Franklin et al. | |
| 6,141,752 A | 10/2000 | Dancs et al. | |
| 6,151,657 A | 11/2000 | Sun et al. | |
| 6,233,683 B1 | 5/2001 | Chan et al. | |
| 6,484,174 B1 | 11/2002 | Wall et al. | |
| 6,609,113 B1 | 8/2003 | O'Leary et al. | |
| 6,629,135 B1 | 9/2003 | Ross et al. | |
| 6,647,260 B2 | 11/2003 | Dusse et al. | |
| 6,792,536 B1 | 9/2004 | Teppler | |
| 6,904,569 B1 | 6/2005 | Anderson | |
| 6,915,279 B2 | 7/2005 | Hogan et al. | |
| 6,931,382 B2 | 8/2005 | Laage et al. | |
| 6,941,285 B2 | 9/2005 | Sarcanin | |
| 6,963,270 B1 | 11/2005 | Gallagher, III et al. | |
| 6,965,880 B2 | 11/2005 | Komori | |
| 7,140,549 B2 | 11/2006 | de Jong | |
| 7,152,782 B2 | 12/2006 | Shenker et al. | |
| 7,159,180 B2 | 1/2007 | Ward | |
| 7,232,073 B1 | 6/2007 | de Jong | |
| 7,243,853 B1 | 7/2007 | Levy et al. | |
| 7,275,685 B2 | 10/2007 | Gray et al. | |
| 7,318,049 B2 | 1/2008 | Iannacci | |
| 7,343,351 B1 | 3/2008 | Bishop et al. | |
| 7,346,170 B2 | 3/2008 | Asano et al. | |
| 7,349,885 B2 | 3/2008 | Gangi | |
| 7,353,396 B2 | 4/2008 | Micali et al. | |
| 7,356,606 B2 | 4/2008 | Choate | |
| 7,374,099 B2 | 5/2008 | de Jong | |
| 7,382,762 B2 | 6/2008 | Chmora et al. | |
| 7,469,151 B2 | 12/2008 | Khan et al. | |
| 7,502,946 B2 | 3/2009 | Perkins et al. | |
| 7,512,567 B2 | 3/2009 | Bemmel et al. | |
| 7,529,689 B2 | 5/2009 | Rowan | |
| 7,571,139 B1 | 8/2009 | Giordano et al. | |
| 7,631,346 B2 | 12/2009 | Hinton et al. | |
| 7,631,810 B2 | 12/2009 | Liu et al. | |
| 7,708,198 B2 | 5/2010 | Gangi | |
| 7,712,658 B2 | 5/2010 | Gangi | |
| 7,739,731 B2 | 6/2010 | Violleau et al. | |
| 7,801,827 B2 | 9/2010 | Bishop et al. | |
| 7,860,486 B2 | 12/2010 | Frank et al. | |
| 7,953,671 B2 | 5/2011 | Bishop et al. | |
| 7,967,215 B2 | 6/2011 | Kumar et al. | |
| 7,996,268 B2 | 8/2011 | Poltorak | |
| 7,996,324 B2 | 8/2011 | Bishop et al. | |
| 8,019,811 B1 | 9/2011 | Britto et al. | |
| 8,041,646 B2 | 10/2011 | Bajan | |
| 8,060,413 B2 | 11/2011 | Castell et al. | |
| 8,073,460 B1 | 12/2011 | Scofield et al. | |
| 8,117,089 B2 | 2/2012 | Minsky et al. | |
| 8,126,806 B1 | 2/2012 | DiMartino et al. | |
| 8,150,767 B2 | 4/2012 | Wankmueller | |
| 8,196,131 B1 | 6/2012 | von Behren et al. | |
| 8,214,299 B2 | 7/2012 | Bishop et al. | |
| 8,401,904 B1 | 3/2013 | Simakov et al. | |
| 8,589,293 B2 | 11/2013 | Singh | |
| 8,606,720 B1 | 12/2013 | Baker et al. | |
| 8,639,587 B1 | 1/2014 | Wheng | |
| 8,639,621 B1 | 1/2014 | Ellis et al. | |
| 8,646,059 B1 | 2/2014 | von Behren et al. | |
| 9,324,098 B1 * | 4/2016 | Agrawal | G06Q 30/04 |
| 2001/0027441 A1 | 10/2001 | Wankmueller | |
| 2001/0037312 A1 | 11/2001 | Gray | |
| 2001/0039657 A1 | 11/2001 | Fopeano et al. | |
| 2001/0051902 A1 | 12/2001 | Messner | |
| 2001/0054012 A1 | 12/2001 | Nayyar | |
| 2002/0004783 A1 | 1/2002 | Paltenghe et al. | |
| 2002/0026419 A1 | 2/2002 | Maritzen et al. | |
| 2002/0038287 A1 | 3/2002 | Villaret et al. | |
| 2002/0042776 A1 | 4/2002 | Woo et al. | |
| 2002/0052853 A1 | 5/2002 | Munoz et al. | |
| 2002/0065774 A1 | 5/2002 | Young et al. | |
| 2002/0068554 A1 | 6/2002 | Dusse | |
| 2002/0069139 A1 | 6/2002 | Bernstein et al. | |
| 2002/0107755 A1 | 8/2002 | Steed et al. | |
| 2002/0123971 A1 | 9/2002 | Maritzen | |
| 2002/0138445 A1 | 9/2002 | Laage et al. | |
| 2002/0179704 A1 | 12/2002 | Deaton | |
| 2002/0194138 A1 | 12/2002 | Dominguez et al. | |
| 2003/0042301 A1 * | 3/2003 | Rajasekaran | G06Q 20/02 235/380 |
| 2003/0074579 A1 | 4/2003 | Della-Libera et al. | |
| 2003/0110133 A1 | 6/2003 | Maritzen et al. | |
| 2003/0182221 A1 | 9/2003 | Forrest et al. | |
| 2003/0191945 A1 | 10/2003 | Keech | |
| 2004/0029569 A1 | 2/2004 | Khan et al. | |
| 2004/0030601 A1 | 2/2004 | Pond et al. | |
| 2004/0123152 A1 | 6/2004 | Le Saint | |
| 2004/0128259 A1 | 7/2004 | Blakeley et al. | |
| 2004/0140351 A1 | 7/2004 | Flugge et al. | |
| 2004/0165009 A1 | 8/2004 | Blakely et al. | |
| 2004/0177005 A1 | 9/2004 | Poltorak | |
| 2004/0243501 A1 | 12/2004 | Duffey, Jr. | |
| 2004/0243520 A1 | 12/2004 | Bishop et al. | |
| 2004/0249712 A1 | 12/2004 | Brown et al. | |
| 2004/0254979 A1 | 12/2004 | Colling et al. | |
| 2004/0260657 A1 | 12/2004 | Cockerham | |
| 2005/0071418 A1 | 3/2005 | Kjellberg et al. | |
| 2005/0184165 A1 | 8/2005 | de Jong | |
| 2005/0188360 A1 | 8/2005 | de Jong | |
| 2005/0193218 A1 | 9/2005 | Susser et al. | |
| 2005/0222961 A1 | 10/2005 | Staib et al. | |
| 2005/0228750 A1 | 10/2005 | Olliphant et al. | |
| 2006/0036570 A1 | 2/2006 | Schaefer et al. | |
| 2006/0041507 A1 | 2/2006 | Novack et al. | |
| 2006/0041638 A1 | 2/2006 | Whittaker et al. | |
| 2006/0126831 A1 | 6/2006 | Cerruti et al. | |
| 2006/0165060 A1 | 7/2006 | Dua | |
| 2006/0166740 A1 | 7/2006 | Sufuentes | |
| 2006/0173974 A1 | 8/2006 | Tang | |
| 2006/0219774 A1 | 10/2006 | Benco et al. | |
| 2007/0016630 A1 | 1/2007 | Samji et al. | |
| 2007/0067325 A1 | 3/2007 | Weitzner et al. | |
| 2007/0106564 A1 | 5/2007 | Matotek et al. | |
| 2007/0135164 A1 | 6/2007 | Lee | |
| 2007/0149183 A1 | 6/2007 | Dunko et al. | |
| 2007/0169043 A1 | 7/2007 | Violleau et al. | |
| 2007/0192865 A1 | 8/2007 | Mackin | |
| 2007/0226786 A1 | 9/2007 | Berger et al. | |
| 2007/0245882 A1 | 10/2007 | Odenwald | |
| 2007/0283268 A1 | 12/2007 | Berger et al. | |
| 2007/0294292 A1 | 12/2007 | Hydrie et al. | |
| 2008/0010215 A1 | 1/2008 | Rackley, III | |
| 2008/0017704 A1 | 1/2008 | VanDeburg et al. | |
| 2008/0056501 A1 | 3/2008 | McGough | |
| 2008/0103982 A1 | 5/2008 | Hammad et al. | |
| 2008/0126145 A1 | 5/2008 | Rackley III, et al. | |
| 2008/0130902 A1 | 6/2008 | Foo Kune et al. | |
| 2008/0147546 A1 | 6/2008 | Weichselbaumer et al. | |
| 2008/0162834 A1 | 7/2008 | Brokenshire et al. | |
| 2008/0167988 A1 | 7/2008 | Sun et al. | |
| 2008/0208681 A1 | 8/2008 | Hammad et al. | |
| 2008/0208742 A1 | 8/2008 | Arthur et al. | |
| 2008/0208744 A1 | 8/2008 | Arthur et al. | |
| 2008/0208762 A1 | 8/2008 | Arthur et al. | |
| 2008/0249938 A1 | 10/2008 | Drake-Stoker | |
| 2008/0270246 A1 | 10/2008 | Chen | |
| 2008/0270253 A1 | 10/2008 | Huang | |
| 2008/0275779 A1 | 11/2008 | Lakshminarayanan | |
| 2008/0318559 A1 | 12/2008 | Porco | |

(56) References Cited

U.S. PATENT DOCUMENTS

| | | |
|---|---|---|
| 2009/0063312 A1 | 3/2009 | Hurst |
| 2009/0119190 A1 | 5/2009 | Realini |
| 2009/0125429 A1* | 5/2009 | Takayama ............... 705/35 |
| 2009/0157450 A1 | 6/2009 | Athsani et al. |
| 2009/0158028 A1 | 6/2009 | Jung et al. |
| 2009/0170483 A1 | 7/2009 | Barnett et al. |
| 2009/0210308 A1 | 8/2009 | Toomer et al. |
| 2009/0233579 A1 | 9/2009 | Castell et al. |
| 2009/0234751 A1 | 9/2009 | Chan et al. |
| 2009/0254437 A1 | 10/2009 | Lee et al. |
| 2009/0261172 A1 | 10/2009 | Kumar et al. |
| 2009/0265241 A1 | 10/2009 | Bishop et al. |
| 2009/0265249 A1 | 10/2009 | Bishop et al. |
| 2009/0265250 A1 | 10/2009 | Bishop et al. |
| 2009/0271277 A1 | 10/2009 | Bishop et al. |
| 2009/0271278 A1 | 10/2009 | Bishop et al. |
| 2009/0287564 A1 | 11/2009 | Bishop et al. |
| 2009/0287565 A1 | 11/2009 | Bishop et al. |
| 2009/0288012 A1* | 11/2009 | Hertel ............... G06Q 20/02 715/738 |
| 2009/0299841 A1 | 12/2009 | Bishop et al. |
| 2009/0307139 A1 | 12/2009 | Mardikar et al. |
| 2009/0307140 A1 | 12/2009 | Mardikar |
| 2009/0307142 A1 | 12/2009 | Mardikar |
| 2010/0012732 A1 | 1/2010 | Pinzinger et al. |
| 2010/0042824 A1 | 2/2010 | Lee et al. |
| 2010/0050271 A1 | 2/2010 | Saarisalo |
| 2010/0063893 A1 | 3/2010 | Townsend |
| 2010/0063906 A1 | 3/2010 | Nelsen et al. |
| 2010/0082485 A1 | 4/2010 | Lin et al. |
| 2010/0088237 A1 | 4/2010 | Wankmueller |
| 2010/0114731 A1 | 5/2010 | Kingston et al. |
| 2010/0125495 A1 | 5/2010 | Smith et al. |
| 2010/0125510 A1 | 5/2010 | Smith et al. |
| 2010/0131347 A1 | 5/2010 | Sartipi |
| 2010/0131413 A1 | 5/2010 | Kranzley et al. |
| 2010/0138518 A1 | 6/2010 | Aiglstorfer et al. |
| 2010/0145751 A1 | 6/2010 | Berry et al. |
| 2010/0153519 A1 | 6/2010 | Takayama et al. |
| 2010/0161493 A1 | 6/2010 | Bennau et al. |
| 2010/0169182 A1 | 7/2010 | Madani |
| 2010/0203870 A1 | 8/2010 | Hubinak et al. |
| 2010/0205432 A1 | 8/2010 | Corda et al. |
| 2010/0217682 A1* | 8/2010 | Chan ............... 705/26 |
| 2010/0228624 A1 | 9/2010 | Morris et al. |
| 2010/0241565 A1 | 9/2010 | Starai et al. |
| 2010/0258625 A1* | 10/2010 | Stanfield ............... G06Q 20/24 235/380 |
| 2010/0260388 A1* | 10/2010 | Garrett ............... G06Q 20/22 382/124 |
| 2010/0291896 A1 | 11/2010 | Corda |
| 2010/0291899 A1 | 11/2010 | Machani |
| 2010/0291904 A1 | 11/2010 | Musfeldt et al. |
| 2010/0306076 A1 | 12/2010 | Taveau et al. |
| 2010/0306113 A1 | 12/2010 | Gray et al. |
| 2010/0306531 A1 | 12/2010 | Nahari |
| 2010/0312667 A1 | 12/2010 | Bishop et al. |
| 2010/0323681 A1 | 12/2010 | Corda et al. |
| 2010/0330958 A1 | 12/2010 | Corda et al. |
| 2010/0332336 A9 | 12/2010 | Quigley et al. |
| 2011/0016275 A1 | 1/2011 | Lemonnier et al. |
| 2011/0029671 A1 | 2/2011 | Deprun et al. |
| 2011/0072425 A1 | 3/2011 | Lemonnier et al. |
| 2011/0078081 A1 | 3/2011 | Pirzadeh et al. |
| 2011/0087595 A1 | 4/2011 | Sabella |
| 2011/0087610 A1 | 4/2011 | Batada et al. |
| 2011/0113473 A1 | 5/2011 | Corda et al. |
| 2011/0131421 A1 | 6/2011 | Jogand-Coulomb et al. |
| 2011/0145049 A1 | 6/2011 | Hertel et al. |
| 2011/0184790 A1 | 7/2011 | Deol Brar et al. |
| 2011/0208575 A1 | 8/2011 | Bansal et al. |
| 2011/0211689 A1 | 9/2011 | von Mueller et al. |
| 2011/0212711 A1 | 9/2011 | Scott |
| 2011/0246284 A1 | 10/2011 | Chaikin et al. |
| 2011/0276412 A1 | 11/2011 | Mgrdechian et al. |
| 2011/0276569 A1 | 11/2011 | Kanefsky |
| 2012/0078735 A1 | 3/2012 | Bauer et al. |
| 2012/0084204 A1 | 4/2012 | Castell |
| 2012/0095853 A1 | 4/2012 | von Bose et al. |
| 2012/0116921 A1 | 5/2012 | Fogel et al. |
| 2012/0117455 A1 | 5/2012 | Fogel et al. |
| 2012/0117569 A1 | 5/2012 | Fogel et al. |
| 2012/0136780 A1 | 5/2012 | El-Awady et al. |
| 2012/0158584 A1 | 6/2012 | von Behren et al. |
| 2012/0158654 A1 | 6/2012 | Behren et al. |
| 2012/0159105 A1 | 6/2012 | von Behren et al. |
| 2012/0166333 A1 | 6/2012 | von Behren et al. |
| 2012/0197794 A1 | 8/2012 | Grigg et al. |
| 2012/0203632 A1 | 8/2012 | Blum et al. |
| 2012/0203696 A1 | 8/2012 | Morgan et al. |
| 2012/0215697 A1 | 8/2012 | Olliphant et al. |
| 2012/0234911 A1 | 9/2012 | Yankovich et al. |
| 2012/0239417 A1 | 9/2012 | Pourfallah et al. |
| 2012/0253985 A1 | 10/2012 | Maron et al. |
| 2012/0265684 A1 | 10/2012 | Singh |
| 2012/0267432 A1 | 10/2012 | Kuttuva |
| 2012/0323710 A1 | 12/2012 | Luke |
| 2013/0046643 A1 | 2/2013 | Wall et al. |
| 2013/0054454 A1 | 2/2013 | Purves et al. |
| 2013/0073448 A1 | 3/2013 | Wall et al. |
| 2013/0111207 A1 | 5/2013 | von Behren et al. |
| 2013/0124408 A1 | 5/2013 | Quigley et al. |
| 2013/0159080 A1 | 6/2013 | Wu et al. |
| 2013/0198066 A1 | 8/2013 | Wall et al. |
| 2013/0254115 A1 | 9/2013 | Pasa et al. |
| 2013/0282488 A1 | 10/2013 | Blum et al. |
| 2013/0332337 A1 | 12/2013 | Tran |
| 2013/0339145 A1 | 12/2013 | Blum et al. |
| 2014/0012701 A1 | 1/2014 | Wall et al. |
| 2014/0012751 A1 | 1/2014 | Kuhn et al. |
| 2014/0025580 A1 | 1/2014 | Bacastow |
| 2014/0081854 A1 | 3/2014 | Sanchez et al. |
| 2014/0136349 A1 | 5/2014 | Dave et al. |
| 2014/0365371 A1 | 12/2014 | Ohlhausen |
| 2015/0019417 A1 | 1/2015 | Andrews et al. |

FOREIGN PATENT DOCUMENTS

| | | |
|---|---|---|
| KR | 2007105660 A | 10/2007 |
| WO | 01/22374 A1 | 3/2001 |
| WO | WO 01/43033 A1 | 6/2001 |
| WO | 2004/054125 A1 | 6/2004 |
| WO | WO 2008/005018 A2 | 1/2008 |
| WO | WO 2008/157806 A2 | 12/2008 |
| WO | WO 2009/111857 A1 | 9/2009 |
| WO | WO 2010/110625 A2 | 9/2010 |
| WO | WO 2011/008625 A1 | 1/2011 |
| WO | WO 2011/148873 A1 | 1/2011 |
| WO | WO 2011/053914 A2 | 5/2011 |
| WO | WO 2011/120170 A1 | 10/2011 |
| WO | 2012/083113 A2 | 6/2012 |
| WO | WO 2012/116125 A1 | 8/2012 |
| WO | WO 2012/122065 A1 | 9/2012 |
| WO | WO 2012/142315 A2 | 10/2012 |
| WO | WO 2012/166790 A1 | 12/2012 |
| WO | 2012/083113 A3 | 1/2013 |
| WO | WO 2013/110084 A1 | 7/2013 |
| WO | WO 2013/166507 A1 | 11/2013 |
| WO | 2014/210227 A1 | 12/2014 |

OTHER PUBLICATIONS

U.S. Appl. No. 13/235,167, filed Sep. 16, 2011.
U.S. Appl. No. 13/412,957, filed Mar. 6, 2012.
Wayback Machine Internet Archive, American Express Membership Rewards Program, pp. 1-3, Nov. 18, 2000.
Hwan, P. J., International Search Report and Written Opinion for International Patent Application No. PCT/US2011/065363, pp. 1-10, Aug. 1, 2012.
Hamilton, S. C., Office Action issued in co-pending U.S. Appl. No. 13/412,957, filed Mar. 6, 2012, pp. 1-20, Nov. 14, 2012.
Lubbers et al., Using the HTML5 Web Storage API, *Pro HTML5 Programming*, pp. 213-241, Jan. 1, 2010.

(56) References Cited

OTHER PUBLICATIONS

Oehlman et al., HTML5 Storage APIs, *Pro Android Web Apps*, Chapter 3, pp. 47-63, Jan. 1, 2011.
U.S. Appl. No. 13/729,672 to Hiller et al., filed Dec. 28, 2012.
Gillmore, A., AU Office Action issued in Australian Patent Application No. 2011343638, pp. 1-4, Aug. 6, 2012.
Hamilton, S. C., Office Action issued in co-pending U.S. Appl. No. 13/412,957, filed Mar. 6, pp. 1-20, Jul. 16, 2013.
Winter, J. M., Office Action issued in copending U.S. Appl. No. 13/235,167, filed Sep. 16, 2011, pp. 1-16, Aug. 7, 2013.
U.S. Appl. No. 13/928,349 to Andrews et al., filed Jun. 26, 2013.
Hamilton, S., Office Action issued in co-pending U.S. Appl. No. 13/412,957, filed Mar. 6, 2012, pp. 1-18, Nov. 24, 2014.
Hamilton, S., Office Action issued in co-pending U.S. Appl. No. 13/412,957, filed Mar. 6, 2012, pp. 1-15, Oct. 2, 2015.
Prinslow, G., Office Action issued in copending U.S. Appl. No. 13/928,349, filed Jun. 26, 2013, pp. 1-29, Nov. 13, 2015.
Winter, J., Office Action issued in copending U.S. Appl. No. 13/235,167, filed Sep. 16, 2011, pp. 1-15, Apr. 4, 2014.
Prinslow, G., Office Action issued in copending U.S. Appl. No. 13/928,349, filed Jun. 26, 2013, pp. 1-25, Feb. 25, 2015.
Winter, J., Office Action issued in copending U.S. Appl. No. 13/235,167, filed Sep. 16, 2011, pp. 1-14, Jun. 11, 2015.
Smith Micro Software Announces Acquisition of PhoTags, Inc. (Abstract only), *PR Newswire*, pp. 1, Sep. 23, 2012.
Square, Inc.; Agency Reviws Patent Application Approval Request for "Cardless Payment Transactions", *Investment Weekly News*, pp. 585, Jul. 13, 2013.
Square, Inc.; Researchers Submit Patent Application, "Cardless Payment Transactions", for Approval (Abstract only), *Computer Weekly News*, pp. 1554, Jun. 13, 2013.
STIC Search Report (EIC 3600) Peformed for U.S. P.T.O, pp. 1-54, May 21, 2014.
Smith Micro Software Announces Acquisition of PhoTags, Inc.; Acquisition of Innovative Multimedia Software Company for Next Generation Mobile Devices Allows Wireless Carriers and Handset Manufacturers to Offer Leading Edge Musci, *PR Newswire*, pp. 1, Apr. 3, 2006.
Square, Inc: Researchers Submit Patent Application, "Authorization of Cardless Payment Transactions", for Approval (Abstract only), *Computer Weekly*, pp. 731, Jan. 30, 2014.
Square, Inc.; Patent Application Titled "Authorization of Cardless Payment Transactions" Published Online (Abstract only), *Computer Weekly News*, pp. 624, Jan. 30, 2014.
Bocoum, M., Acceptance Threshold's Adaptability in Fingerprint-Based Authentication Methods (Abstract only), McGill Unversity, *ProQuest*, pp. 1-139, 2000.
Clement, A., Exploring Policy Issues of Electronic Cash: The Mondex Case (Abstract only), *Canadian Journal of Communication*, vol. 24(2), pp. 261-288, 1999.
Crone, R., Mobile Payments (Abstract only), *Credit Union Magazine*, vol. 79(6), pp. 24-28, Jun. 2013.
Hamilton, S., Office Action issued in copending U.S. Appl. No. 13/412,957, filed Mar. 6, 2012, pp. 1-23, Jul. 11, 2014.
Jones, F., eHealth Consumerism: An Exploratory Study of the Impact People Who Wish to communicate with their Physician via Internet-Based Applications will Have on the Physician's Practice (Abstract only), Medical University of South Carolina—College of Health Professions, pp. 1-133, Jun. 12, 2010.
Kianieff, M., Consumer Retail Online Electronic Payments: Potential Liberation Technology or Source of Despair? (Absract only), York University, Canada, pp. 1-446, Jun. 17, 2010.
Larsen, A., Virtual Cash Gets Real—Businesses are Deploying New Online Payment Technologies in Lieu of Credit-Card Systems (Abstract only), *InformationWeek*, vol. 46, pp. 46, Sep. 21, 2012.
Larsen, A., Virtual Cash Gets Real (Abstract only), *InformationWeek*, vol. 736, pp. 46-58, Jun. 10, 2010.
Malone, T., Relational Marketing: Value Integrated Systems and Applications, A Metatriangulation Analysis of how Customer Value is Created in Transaction Exchange in Electronic Commerce and its Implications to Marketing (Abstract only), *The Union Institute*, pp. 1-427, Jun. 17, 2010.
Oh, G., International Search Report and Written Opinion issued in International Application No. PCT/US2014/044201, pp. 1-8, Oct. 15, 2014.
Prinslow, G., Office Action issued in copending U.S. Appl. No. 13/928,349, filed Jun. 26, 2013, pp. 1-16, Aug. 6, 2014.
Reid, K., Risk-e-business: A Framework for Legal Risk Management Developed Through an Analysis of Selected Legal Risk in Internet Commerce (Abstract only), University of New South Wales (Australia), pp. 1-493, Jun. 17, 2010.
Rysavy, P., Mobile Commerce ASPs Do the Legwork—For now, Forget About Building a Mobile-Commerce Platform from Scratch (Abstract only), *Network Computing*, vol. 12(2), pp. 71-79, Jan. 22, 2001.
Rysavy, P., Mobile-Commerce ASPs Do the Legwork—For now, Forget ABout Building a Mobile-Commerce Platform from Scratch (Abstract only), *Network Computing*, pp. 71, Jan. 22, 2001.
Sanchez-Morcilio, R., Attitudes Students Toward Electronic Cash (Abstract only), Argosy University/Sarasota, pp. 1-196, Jun. 17, 2010.
Wall, K., A New Set of Tricks (Abstract only), *Upside*, pp. 118-124, Mar. 1, 2001.
Winter, J., Office Action issued in copending U.S. Appl. No. 13/235,167, filed Sep. 16, 2011, pp. 1-13, Nov. 6, 2014.
Baharlou, "International Preliminary Report on Patentability issued in International Application No. PCT/US2011/065363", mailed on Jun. 27, 2013, 7 pages.
Boly, et al., "The ESPRIT Project CAFE—High Security Digital Payment Systems", 1994, 14 pages.
Chen, "How to Write a Java Card Applet: A Developer's Guide", Jul. 1, 1999, 10 pages.
Corum, "Santa Clara Puts Payments in 'Palm' of Your Hand: Palms and Cellphones Initiate Payments to Campus Card System", vol. 2, No. 5, May 2003, 2 pages.
Daswani, et al., "SWAPEROO: A Simple Wallet Architecture for Payments, Exchanges, Refunds, and Other Operations", Sep. 3, 1998, 20 pages.
Dotzer, "Aspects of Multi-Application Smart Card Management Systems", Oct. 15, 2002, 124 pages.
EPC, "EPC-GSMA Trusted Service Manager Service Management Requirements and Specifications", EPC 220-08, Version 1.0, Jan. 2010, 60 pages.
Gemalto N.V., "The Role of the TSM", The Review, on pp. 7, Winter 2008, 36 pages.
Globalplatform, "Global Platform: Contactless Services", Card Specification v2.2—Amendment C, Version 1.0, Feb. 2010, 77 pages.
Hernandez, et al., "E-Wallet Software Architecture and Decentralized Credentials", 2003, 12 pages.
Hernandez, "E-Wallet with Decentralized Credential Keepers", Jun. 30, 2003, 74 pages.
Huang, et al., "Future Personal E-Payment", IEEE Wireless Communications, Feb. 2006, 7 pages.
Mjolsnes, "On-Line E-Wallet System with Decentralized Credential Keepers", Mobile Network and Applications 8, 2003, 13 pages.
Moon, "International Preliminary Report on Patentability issued in International Application No. PCT/US2014/044201", mailed on Jan. 7, 2016, 7 pages.
NXP, "AN10787 MIFARE Application Directory (MAD)", Jul. 7, 2010, 23 Pages, 23 pages.
Prinslow, "U.S. Office Action issued in copending U.S. Appl. No. 13/928,349, filed Jun. 26, 2013", mailed on May 26, 2016, 23 pages.
SCA, "Mobile Payments at the Physical Point-of-Sale: Assessing U.S. Market Drivers and Industry Direction", Pub. No. PT-05001, Apr. 2005, 52 pages.
Sun Microsystem, "Runtime Environment Specification", Java Card Platform, Version 3.0, Mar. 2008, 158 pages.
Xu, et al., "Design of Objects Sharing Mechanism with Security Domain in Java Smart Card", International Conference on Electronic Computer Technology, 2009, 5 pages.

(56) References Cited

OTHER PUBLICATIONS

Yin, "Google Wallet Aims to Make Mobile Payments Mainstream", May 26, 2011, 2 pages.
Yin, "Google Wallet is Just Another Pilot, Says World's Largest SIM Card Maker", May 27, 2011, 1 page.
Yliuntinen, "3'd party TSM Management of SIM Cards", Sep. 2011, 5 pages.
Yun, et al., "Design and Implementation of Wireless Payment System Using GVM and MobileC", vol. 1, 2005, 10 pages.

\* cited by examiner

DIGITAL WALLET

RELATED APPLICATIONS

This application claims priority to U.S. Provisional Patent Application No. 61/424,611, filed Dec. 17, 2010 and entitled "Digital Wallet." The entire contents of the above-identified priority application are hereby fully incorporated herein by reference.

TECHNICAL FIELD

The present disclosure relates generally to electronic commerce, and more particularly to a digital wallet for facilitating transactions and storing information associated with transactions.

BACKGROUND

Electronic commerce, such as online shopping, has been increasingly common since the advent of the Internet. Online shopping websites generally provide a user interface for customers to select products to purchase. After the customer has selected products for purchase, the customer typically can choose from multiple payment options to purchase the products. Two conventional payment options generally supported by online merchants are using a financial account (for example, a credit card account or checking account) and using a third party payment processor, such as PAYPAL® or other processor.

To complete an online purchase using a credit card or other financial account, a consumer typically provides a significant amount of information to the merchant via the merchant's website. This information generally includes an account identifier (for example, credit card number, debit card number, etc.), shipping information, and the name, address, and contact information of the consumer. The requirement of entering this information for each merchant from which the consumer makes purchases can be cumbersome and frustrating to the consumers. This requirement can be particularly frustrating and difficult for consumers making online purchases using a mobile device, as many mobile devices do not include a user interface optimized to enter significant amounts of information. This deficiency for mobile devices results in substantially lower mobile browser conversion rates from product searching to product purchase compared to desktop browser conversion rates.

One conventional approach to alleviating the burden on the consumer involves a toolbar plug-in application for web browsers. Conventional toolbar applications are used to automatically populate web forms, such as a web form for receiving payment and consumer information for completing an online purchase, with stored information. However, these conventional toolbar applications often are inaccurate, as they merely attempt to predict which form is presented on a web page and then preload default values for the predicted form.

The use of a third party payment processor to complete online purchases is another approach to alleviating the burden of entering a significant amount of information at each merchant's website. Generally, a third party processor requires a consumer to register for an account and to provide one or more payment options. After registering, the consumer can use the payment options to complete purchases at participating merchants' websites. To complete an online purchase using the third party payment processor, the consumer generally selects a link at the merchant's website and, in response, the consumer is redirected from the merchant's website to a website of the third party payment processor. At this website, the consumer first has to provide login information and then can select one of the payment options to complete and confirm the purchase. After the purchase is confirmed, the consumer is directed back to the merchant's website. The third party payment processor then settles with the financial institution associated with the selected payment option and with the merchant to complete the transaction.

The use of a third party processor has several deficiencies. First, the process is disruptive to the consumer as the consumer is directed away from the merchant's website to the third party payment processor's website and then back to the merchant's website. Second, the use of a third party payment processor limits the amount of information that the merchant receives. For example, the merchant may not have access to information associated with the consumer or information regarding the payment method used. The use of a third party processor also presents an additional cost to the merchant.

Thus, a need in the art exists for systems and methods that overcome one or more of the above-described limitations.

SUMMARY

An aspect of the present invention provides a computer-implemented method for completing an online transaction. A digital wallet module resident on a client device receives a request for payment information to complete the transaction. The request originates from a website of a merchant. In response to receiving the request, the digital wallet module retrieves the payment information from a storage location on the client device and transmits the retrieved payment information to the merchant website.

Another aspect of the present invention provides a computer program product for completing an online transaction. The computer program product includes a computer-readable storage device having computer-readable program instructions stored therein. The computer-readable program instructions includes computer program instructions for receiving a request for payment information to complete the transaction, the request originating from a website of a merchant; computer program instructions for retrieving, in response to the request, the payment information; and computer program instructions for transmitting the retrieved payment information to the merchant website.

Another aspect of the present invention provides an apparatus for completing an electronic purchase from a merchant via a distributed network. The apparatus includes a web browser application a digital wallet module logically coupled to the web browser application. The digital wallet module is configured to receive a request for payment information to use in completing the purchase from the merchant website; retrieve payment information from a computer-readable storage device logically coupled to the digital wallet module; and transmit the retrieved payment information to the merchant.

Another aspect of the present invention provides a computer-implemented method for completing a purchase from a merchant via a website of the merchant. A digital wallet module embedded in a web browser in communication with the merchant website receives a purchase request message including a request for payment information for use in compensating the merchant for the purchase. In response to receiving the purchase request message, the digital wallet module presents a confirmation display requesting a user to authorize the purchase. In response to receiving authorization from the user, the digital wallet module retrieves stored payment information and transmits a payment authorization message including the retrieved payment information to the merchant website.

DETAILED DESCRIPTION OF THE EXEMPLARY EMBODIMENTS

Overview

Figure 1:
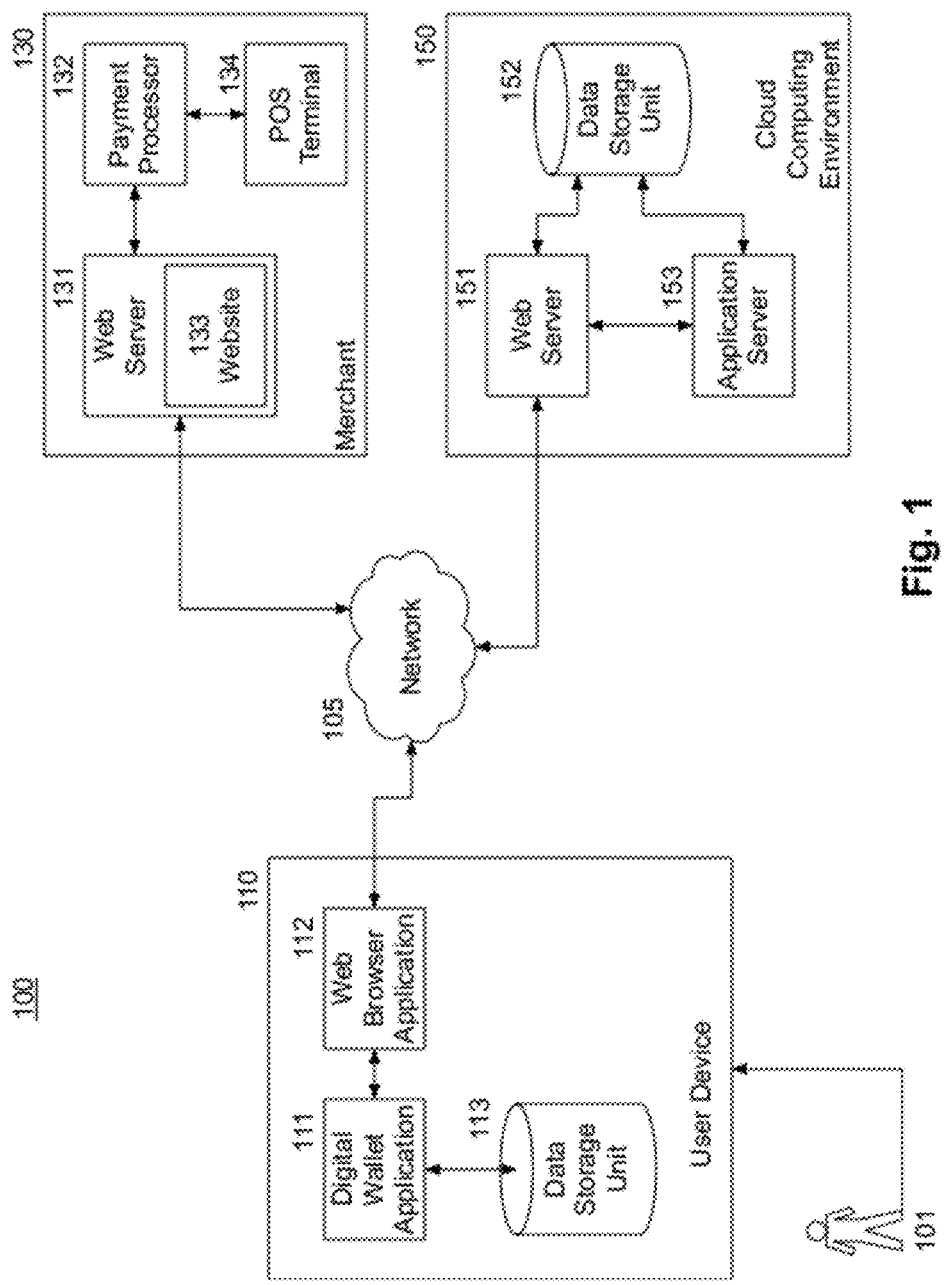
FIG. 1 is a block diagram depicting an operating environment of a digital wallet, in accordance with certain exemplary embodiments.

The exemplary embodiments provide a digital wallet that can facilitate fast, convenient, and secure commerce using a mobile electronic device (or non-mobile electronic device) and that stores information associated with transactions, such as purchase confirmations and receipts. The digital wallet can provide a user interface for entering information for use in transactions, such as information associated with one or more financial accounts (for example, credit card or debit card information), contact information, and shipping information. The digital wallet can store this information for subsequent use in online (for example, via the Internet) and offline purchases (for example, via a merchant point of sale device, including a contactless payment device). The user can use the digital wallet to complete purchases by selecting a payment option stored by the digital wallet without the need to re-enter financial account information, contact information, or shipping information for each purchase. The user also may select a default payment option to use such that the user can confirm a purchase without making a payment option selection. The digital wallet can be particularly advantageous when utilized to complete a purchase using a mobile device, such as a mobile phone or other electronic device, having a limited user interface that may not be optimized to enter a significant amount of information.

The digital wallet can be embodied as a stand alone application program or as a companion program to a web browser, for example, as a companion program to a Hypertext Markup Language revision 5 ("HTML5") compliant web browser or other type of web browser having messaging and storage capabilities. In a web browser embodiment, the digital wallet can leverage the messaging and storage capabilities of the web browser to provide a consistent buying experience across multiple merchant websites. That is, the digital wallet can provide a consistent user interface independent of merchants' differing websites. The digital wallet also can allow a user to complete a purchase without navigating from the merchant's website as required by third party payment processors. While certain embodiments are described in which parts of the digital wallet are implemented in software, it will be appreciated that one or more acts or functions of the digital wallet may be performed by hardware, software, or a combination thereof, as may be embodied in one or more computing systems.

To complete an online transaction using the digital wallet, a user can navigate to a merchant's website using a web browser and locate one or more products. After the user indicates a desire to purchase one or more products, the digital wallet can interact with the merchant's website and with the user in a secure manner to complete the transaction. Once the transaction is completed, the digital wallet can receive or generate a confirmation or receipt for the transaction and can store the confirmation or receipt. The digital wallet also can synchronize the confirmation or receipt with a remote storage location, such as a cloud computing environment.

To complete an offline purchase at a merchant's store location, the digital wallet can interact with a merchant's point of sale device and with the user. The user can activate the digital wallet, for example, by launching an application, by pressing a physical or virtual button on the mobile device, or by making a gesture with the mobile device. The digital wallet can then communicate payment information to the point of sale device and, when the payment information is confirmed, receive a receipt from the point of sale device. The mobile device can communicate with the point of sale device using a wireless technology, such as near field communication technology (NFC), BLUETOOTH, or other suitable wireless technology.

The digital wallet can also store coupons or loyalty reward for use in transactions and can automatically apply the stored coupons during a purchase transaction, if appropriate. For example, a coupon for a product may be displayed to a user in response to an Internet search. The user can download the coupon to the digital wallet and store the coupon on the mobile device. The digital wallet can search the coupons during purchases to determine if one or more of the stored coupons may be applied to the purchase. If so, the digital wallet can automatically apply the stored coupon.

The digital wallet can communicate with a remote system to facilitate multiple functions. For example, the digital wallet can receive security information that identifies trusted merchants and non-trusted merchants from the remote system. The digital wallet can use this security information to prevent the user from providing financial account information or other information to non-trusted merchants. For example, the digital wallet may compare a merchant name, merchant website Uniform Resource Locator (URL), or Internet Protocol (IP) address to a list of known non-trusted merchants prior to passing information from the digital wallet to the merchant's website.

The remote system also can maintain an account for each individual user. This user account can include information associated with payment options for use in transactions and receipts or other information regarding completed transactions. The digital wallet can synchronize, for example, periodically, with the remote system to maintain current information at both locations. The remote system also may provide a user interface via a web browser that enables the user to modify information, such as financial account information of stored payment options and contact information for use in transactions, and to access stored receipts. The user can access the stored receipts, for example, to determine when a certain purchase was made, to determine how much the user paid for an item, or for budgeting purposes. In certain implementations, the remote system or a third party having access to the receipts stored at the remote system can use the receipts to target advertisements or other promotional materials to the user.

Users may, in appropriate circumstances, be allowed to limit or otherwise affect the operation of the features disclosed in this specification. For example, users may be given an initial opportunity to opt-in or opt-out of the collection or use of certain data or the activation of certain features. In addition, users may be provided opportunities to change the manner in which the features are employed, including for situations in which users may have concerns regarding their privacy. Instructions also may be provided to users to notify the users regarding policies about the use of information, including personally identifiable information and receipt information, and manners in which the users may affect such use of information. Thus, sensitive personal information can be used to benefit a user, if desired, through receipt of targeted advertisements or other information, without risking disclosure of personal information or the user's identity.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as the act may be performed by more than one computer. The inventive functionality of the invention will be explained in more detail in the following description, read in conjunction with the figures illustrating the program flow.

System Architecture

Turning now to the drawings, in which like numerals represent like (but not necessarily identical) elements throughout the figures, exemplary embodiments of the present invention are described in detail. FIG. 1 is a block diagram depicting an operating environment 100 for a digital wallet, in accordance with certain exemplary embodiments.

Referring to FIG. 1, the exemplary operating environment 100 includes a merchant system 130, a cloud computing environment 150, and a user device 110 associated with a user 101. The user device 110 may be a personal computer, mobile device, (for example, notebook computer, tablet computer, netbook computer, personal digital assistant (PDA), video game device, GPS locator device, cellular telephone, smartphone, or other mobile device), or other appropriate technology that includes or is coupled to a web browser application module 112, such as GOOGLE'S CHROME, MICROSOFT'S INTERNET EXPLORER®, or MOZILLA'S FIREFOX®.

In certain exemplary embodiments, the web browser application 112 is an HTML5 compliant web browser. HTML5 compliant web browsers include a cross-document messaging application programming interface (API) and a local storage API that previous HTML versions did not have. The cross-document messaging API of HTML5 compliant web browsers enables documents, such as web pages, to communicate with each other. For example, a first document can send a message to a second document requesting information. In response, the second document can send a message including the requested information to the first document. The local storage API of HTML5 compliant web browsers enables the web browser to store information on a client device upon which the web browser is installed or is executing, such as the user device 110. Websites also can employ the local storage API to store information on a client device. Other web browsers having cross-document messaging and/or local storage capabilities also may be used in certain exemplary embodiments.

The user 101 can use the web browser application 112 to view, download, upload, or otherwise access documents or web pages via a distributed network 105. The network 105 includes a wired or wireless telecommunication system or device by which network devices (including devices 110, 130, and 150) can exchange data. For example, the network 105 can include a local area network ("LAN"), a wide area network ("WAN"), an intranet, an Internet, or any combination thereof. Throughout the discussion of exemplary embodiments, it should be understood that the terms "data" and "information" are used interchangeably herein to refer to text, images, audio, video, or any other form of information that can exist in a computer based environment.

The web browser application 112 can interact with web servers (or other computing devices) connected to the network 105, such as web server 132 of the merchant system 130 and/or web server 151 of the cloud computing environment 150.

The user device 110 also includes a digital wallet application module 111. The exemplary digital wallet 111 can interact with the web browser application 112 or can be embodied as a companion application of the web browser application 112. As a companion application, the digital wallet 111 executes within the web browser application 112. That is, the digital wallet 111 may be an application program embedded in the web browser application 112.

The user device 110 also includes a data storage unit 113 accessible by the digital wallet 111 and the web browser application 112. The exemplary data storage unit 113 can include one or more tangible computer-readable storage devices as discussed below with reference to FIG. 2. The data storage unit 113 can be stored on the user device 110 or can be logically coupled to the user device 110. For example, the data storage unit 113 can include on-board flash memory and/or one or more removable memory cards or removable flash memory.

The exemplary digital wallet 111 enables storage of one or more payment options that can be used for online purchases and offline purchases. Each payment option can include or be associated with a financial account, such as a credit card account, a debit card account, a checking account, a savings account, a loyalty rewards account, or other type of account that can be used to make a purchase. The digital wallet 111 can store, for each payment option, information associated with the financial account for that payment option. This payment information can include a financial account identifier (for example, account number, card number), an expiration date of one or more financial cards associated with the financial account, and a billing address for the account. The payment information can also include information associated with the user 101, such as name, contact information (for example, residential address, phone number, e-mail address), demographic information, or any other suitable information associated with the user 101. The payment information also can include shipping information, such as one or more shipping addresses, preferred shipping provider(s), and preferred shipping method(s) (for example, ground, air, expedited, signature confirmation, or other shipping method). The payment information for each payment option can be maintained by the digital wallet 111 and stored in the data storage unit 113.

The user 101 can interact with a user interface provided by the digital wallet 111 to add, modify, or remove payment information from the digital wallet 111. In a web browser companion application embodiment, this user interface can be provided via the web browser application 112. In addition or in the alternative, the payment information may be synchronized with a remote storage location, such as the cloud computing environment 150. In such an embodiment, the user 101 can access the payment information stored at the remote location using another device, such as a desktop computer connected to the network 105. The remote storage location can update the digital wallet 111 in response to any changes made at the remote storage location.

The payment option(s) stored in the digital wallet 111 can be used to complete purchases from merchants via a merchant's website 133 operating on the web server 131 or via a merchant's point of sale device 134. In certain exemplary embodiments, each merchant's website 133 (operating on the web server 131) that accepts payment via a digital wallet 111 can include a set of computer-readable program instructions, for example, using JavaScript, that enable the merchant's website 133 to interact with the digital wallet 111. These program instructions can include program instructions for detecting whether the user device 110 includes a digital wallet 111 and program instructions for attaching to a detected digital wallet 111. Once attached, the merchant's website 133 can communicate with the digital wallet 111, for example, via cross-document messaging. In certain exemplary embodiments, the computer-readable instructions also include program instructions for downloading a digital wallet 111 onto a user device 110. For example, if the merchant's website 133 detects that the user device 110 does not have a digital wallet 111, the merchant's website 133 can prompt the user 101 to download and install the digital wallet 111. If the user 101 elects to download the digital wallet 111, the computer-readable program code can download and install the digital wallet 111 on the user device 101. Embedding this computer-readable program instructions in a website 133 for interacting with a digital wallet 111 supports a simpler and efficient integration for the merchant system 130 compared to integrating with a third party payment processor.

The merchant's website 133 and the digital wallet 111 can communicate using a defined messaging protocol. The digital wallet 111 can encode a message using the protocol and send the encoded message to the merchant's website 133, where the message is decoded using the protocol. Similarly, the merchant's website 133 can encode a message using the protocol and send the encoded message to the digital wallet 111 where the message is decoded using the protocol.

The merchant system 130 includes a payment processor 132 logically coupled to the web server 131. The payment processor 132 can receive payment information via the web server 131 and interact with the financial institution (not shown) or an acquirer (not shown) to authorize payment information.

Figure 3:
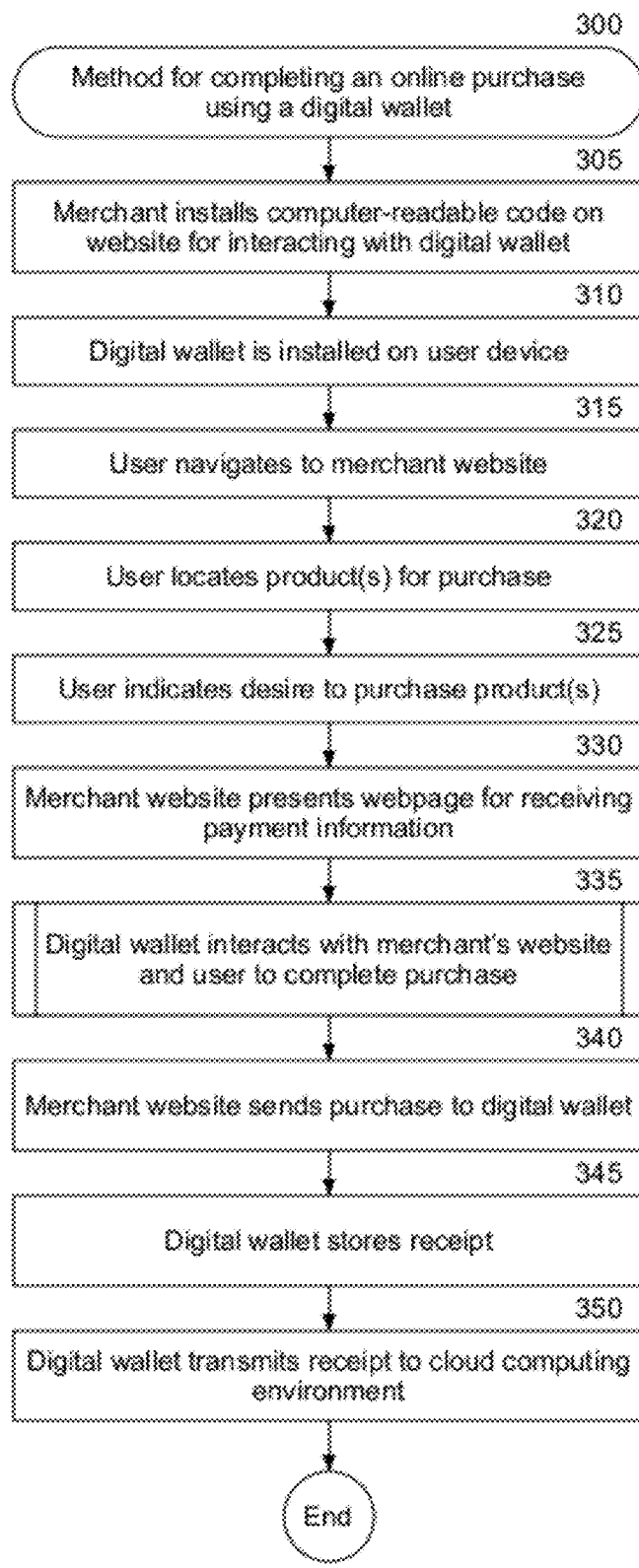
FIG. 3 is a flow chart depicting a method for completing an online purchase using a digital wallet, in accordance with certain exemplary embodiments.

To complete an online purchase via the Internet, the digital wallet 111 can interact with a website 133 of the merchant system 130 and with the user 101. The user 101 can browse the merchant's website 133 for products using the web browser 112 and indicate a desire to purchase one or more products. As used throughout the specification, the term "products" should be interpreted to include tangible and intangible products, as well as services. After the user 101 has indicated a desire to purchase the product(s) (for example, by actuating a "checkout" link), the merchant's website 133 can present a user interface in the form of a web page to receive payment information from the user 101. The merchant's website 133 also can detect whether the user device 110 includes a digital wallet 111. If the digital wallet 111 is detected, the merchant's website 133 can automatically attach to the digital wallet 111 as discussed in further detail below in connection with FIG. 4. In addition or in the alternative, the merchant's website 133 can include a "pay with wallet" link or control that, when actuated, causes the merchant's website 133 to attach to the digital wallet 111. Once attached, the merchant's website 133 sends a purchase request message to the digital wallet 111 requesting payment information. The purchase request message also can include information regarding the requested purchase, including information regarding the product(s) for purchase (for example, name and/or description of each product, price for each product, total price, etc.), information regarding the merchant system 130 (for example, merchant name, payment methods accepted by merchant, etc.), and requests for the user 101 to provide additional information. In response to receiving a purchase request message from the merchant's website 133, the digital wallet 111 can present a user interface to the user 101 for the user 101 to confirm the purchase. This user interface can display all or a portion of the information in the purchase request and an actuatable button or link for the user 101 to confirm the purchase. This user interface also can allow the user 101 to select from multiple payment options stored by the digital wallet 111 to use as payment for the product(s) and from multiple shipping options. If the user 101 confirms the purchase, the digital wallet 111 can retrieve the information requested in the purchase request message, generate a merchant request message that contains the information and the confirmation, and transmit the merchant request message to the merchant's website 133. If the purchase is authorized via the payment processor 132, the merchant's website 133 can transmit an electronic confirmation and/or a receipt to the digital wallet 111 and then detach from the digital wallet 111. The digital wallet 111 can store the confirmation and/or receipt at the user device 110 and also synchronize with the cloud computing environment 150. An exemplary method for completing an online purchase using the digital wallet 111 is illustrated in FIG. 3 and discussed below.

The receipt received by the digital wallet 111 can include line item details of the completed purchase. For example, the receipt can include a list of products purchased, a description of each product purchased, the price for each product purchased, a product category for each product purchased, a total price, a stock keeping unit (SKU) or similar identifier for each product purchased, taxes paid, rebates for one or more of the products purchased, payment method used, discounts applied, the time and/or date of purchase, warranty information for one or more of the products purchased, or other suitable information. The receipt also can include information regarding the merchant system 130, including a name of the merchant associated with the merchant system 130, a description of the 130, the URL of the merchant's website 133, and any other suitable information regarding the merchant system 130.

In certain exemplary embodiments, the digital wallet 111 can generate a receipt for a purchase rather than or in addition to receiving a receipt from the merchant's website 133. For example, the digital wallet 111 can generate the receipt using the information in the purchase request message received from the merchant's website 133 or from the merchant request message sent to the merchant's website 133.

The exemplary cloud computing environment 150 includes the web server 151, one or more data storage units 152, and one or more application servers 153. The cloud computing environment 150 may be provided by the provider of the digital wallet, by a merchant 130, or by another party. In certain exemplary embodiments, multiple cloud computing environments 150 may be employed. For example, a first cloud computing environment may store receipt information and provide access to the receipts from a user device 110 connected to the first cloud computing environment, and a second cloud computing environment may provide security information, such as lists of non-trusted merchants, to the digital wallet 111. Although the illustrated environment includes a cloud computing environment, other types of computing environments, such as a client-server environment may be used instead.

The application server 153 can maintain a digital wallet account for each user, including the user 101. This digital wallet account can store (in the data storage unit 152) the payment options created by the user 101 and their associated payment information and receipts and other information obtained by the digital wallet 111 in response to completed transactions. The application server 153 can synchronize this information with the digital wallet 111 periodically, on command (for example, by the user 101), or in response to an update in information at the digital wallet 111 or at the cloud computing environment 150.

The digital wallet 111 and the web browser application 112 can interact with the application server 151 via the web server 151. The application server 153 can provide a user interface via the web server 151 that enables the user 101 to access, view, and/or modify content stored in the user's digital wallet account using the user device 110 or another device connected to the network. For example, the user 101 may add or modify payment information using a web browser application residing on a desktop computer having a better user interface for entering a significant amount of information.

The exemplary digital wallet 111 can include a user interface for accessing receipt information stored on the user device 110 or at the cloud computing environment 150 in a meaningful and useful way. One feature of this user interface enables the user 101 to search the receipts for information. For example, the user 101 may search for a product purchased to determine the price that was paid for the product or when the product was purchased. In another example, the user 101 may search for warranty information regarding a product to determine if the warranty has expired. In yet another example, the user 101 may search the receipts for merchant return policy information.

This digital wallet's user interface also includes a budgeting feature. This budgeting feature of the digital wallet 111 enables the user 101 to set a budget for expenditures associated with one or more products or product categories and to monitor this budget using the stored receipts. For example, the user 101 can set a budget of $200 to spend eating out each month. The digital wallet 111 can run a query on the receipts corresponding to transactions completed in the current month to identify receipts that correspond to a restaurant purchase or otherwise to eating out. The digital wallet 111 can then determine the total dollar amount of these receipts and the remaining budget for the current month.

The digital wallet's user interface also enables the user 101 to filter information associated with receipts and view the filtered information. The receipt information can be filtered by product category, merchant, time period, or any other receipt parameter or combination thereof. For example, the user 101 can use the digital wallet 111 to view the total amount spent at a particular merchant, such as the merchant associate with merchant system 130, in the past three months or other desired time period.

Figure 2:
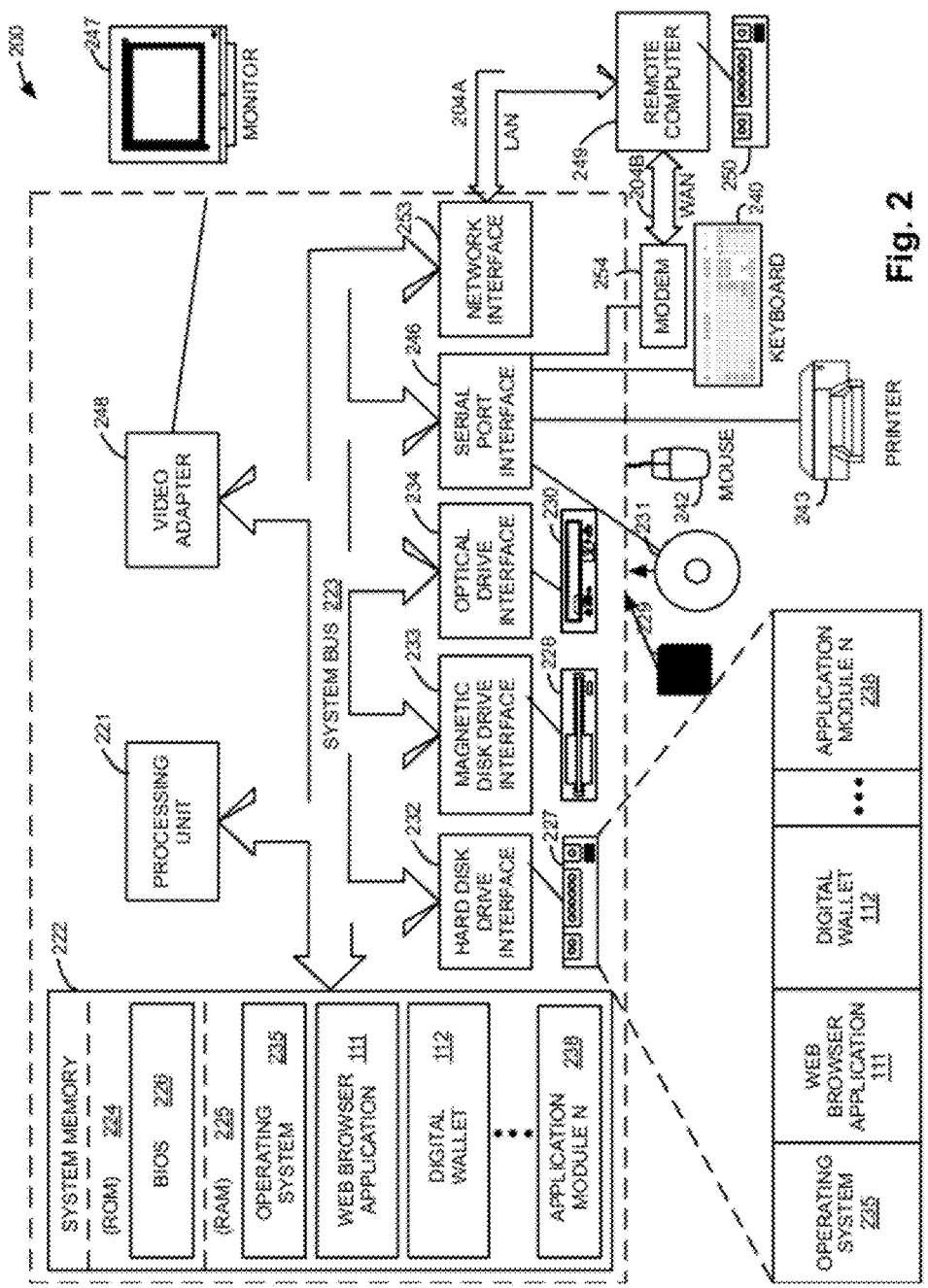
FIG. 2 is a block diagram depicting a general component architecture of a computer system, in accordance with certain exemplary embodiments.

One or more of the components of the exemplary operating environment 100, such as the user device 110, the web server 131, the web server 151, and the application server 153 can include one or more computer systems, such as the computer system 200 illustrated in FIG. 2. Referring to FIG. 2, the computer system 200 includes a processing unit 221, a system memory 222, and a system bus 223 that couples system components, including the system memory 222, to the processing unit 221. The system bus 223 can include any of several types of bus structures, including a memory bus or memory controller, a peripheral bus, or a local bus, using any of a variety of bus architectures. The system memory 222 includes a read-only memory ("ROM") 224 and a random access memory ("RAM") 225. A basic input/output system (BIOS) 226 containing the basic routines that help to transfer information between elements within the computer system 200, such as during start-up, is stored in the ROM 224.

The computer system 200 also includes a hard disk drive 227 for reading from and writing to a hard disk (not shown), a magnetic disk drive 228 for reading from or writing to a removable magnetic disk 229 such as a floppy disk, and an optical disk drive 230 for reading from or writing to a removable optical disk 231 such as a CD-ROM, compact disk-read/write (CD/RW), DVD, or other optical media. The hard disk drive 227, magnetic disk drive 228, and optical disk drive 230 are connected to the system bus 223 by a hard disk drive interface 232, a magnetic disk drive interface 233, and an optical disk drive interface 234, respectively. Although the exemplary computer system 200 employs a ROM 224, a RAM 225, a hard disk drive 227, a removable magnetic disk 229, and a removable optical disk 231, other types of computer-readable media also can be used in the exemplary computer system 200. For example, the computer-readable media can include any apparatus that can contain, store, communicate, propagate, or transport data for use by or in connection with one or more components of the computer system 200, including any electronic, magnetic, optical, electromagnetic, infrared, or semiconductor system (or apparatus or device) or propagation medium, such as magnetic cassettes, flash memory cards, digital video disks, Bernoulli cartridges, and the like. The drives and their associated computer-readable media can provide nonvolatile storage of computer-executable instructions, data structures, program modules, and other data for the computer system 200.

A number of modules can be stored on the ROM 224, RAM 225, hard disk drive 227, magnetic disk 229, or optical disk 231, including an operating system 235, an application module 238, and the web browser application 112, the digital wallet 111, and the website application discussed above in connection with FIG. 1. The web browser application 112, the digital wallet 111, website application, and application module 238 can include routines, sub-routines, programs, objects, components, data structures, etc., which perform particular tasks or implement particular abstract data types.

A user, such as user 101, can enter commands and information to the computer system 200 through input devices, such as a keyboard 240 and a pointing device 242. The pointing device 242 can include a mouse, a trackball, an electronic pen that can be used in conjunction with an electronic tablet, or any other input device, such as a microphone, joystick, game pad, satellite dish, scanner, or the like. These and other input devices are often connected to the processing unit 222 through a serial port interface 246 that is coupled to the system bus 223, but can be connected by other interfaces, such as a parallel port, game port, a universal serial bus (USB), or the like. A display device 247, such as a monitor, also can be connected to the system bus 223 via an interface, such as video adapter 248. In addition to the display device 247, the computer 220 can include other peripheral output devices, such as speakers (not shown) and a printer 243.

The computer system 200 is configured to operate in a networked environment using logical connections to one or more remote computers 249. The remote computer 249 can be any network device, such as a personal computer, a server, a client, a router, a network PC, a peer device, or other device. While the remote computer 249 typically includes many or all of the elements described above relative to the computer system 200, only a memory storage device 250 has been illustrated in FIG. 2 for simplicity. The logical connections depicted in FIG. 2 include a LAN 204A and a WAN 204B. Such networking environments are commonplace in offices, enterprise-wide computer networks, intranets, and the Internet.

When used in a LAN networking environment, the computer system 200 is often connected to the LAN 204A through a network interface or adapter 253. When used in a WAN networking environment, the computer system 200 typically includes a modem 254 or other means for establishing communications over the WAN 204B, such as the Internet. The modem 254, which can be internal or external, is connected to system bus 223 via a serial port interface 246. In a networked environment, program modules depicted relative to computer system 200, or portions thereof, can be stored in the remote memory storage device 250.

It will be appreciated that the network connections shown are exemplary and other means of establishing a communications link between the computers can be used. Moreover, those having ordinary skill in the art having the benefit of the present disclosure will appreciate that the computer system 200 illustrated in FIG. 2 can have any of several other suitable computer system configurations. Furthermore, those skilled in the art having the benefit of the present disclosure will recognize that certain components of the computer system 200 may be added, deleted, or modified in certain alternative embodiments. For example a user device 101 embodied as a mobile phone or handheld computer may not include all the components depicted in FIG. 2 and/or described above.

System Process

The components of the exemplary operating environment 100 are described hereinafter with reference to the exemplary methods illustrated in FIGS. 3-5. The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, a skilled programmer would be able to write such computer programs to implement exemplary embodiments based on the flow charts and associated description in the application text. Therefore, disclosure of a particular set of program code instructions is not considered necessary for an adequate understanding of how to make and use the exemplary embodiments. Further, those skilled in the art will appreciate that one or more acts described may be performed by hardware, software, or a combination thereof, as may be embodied in one or more computing systems.

FIG. 3 is a flow chart depicting a method 300 for completing an online purchase using a digital wallet 111, in accordance with certain exemplary embodiments. With reference to FIGS. 1 and 3, in block 305, the merchant installs computer-readable program instructions on the merchant's website 133 for interacting with the digital wallet 111. These computer-readable program instructions can be implemented as an embedded script, such as JavaScript, in a web page of the merchant system 130. For example, the merchant system 130 can embed the computer-readable program instructions on a "checkout" web page of the merchant's website 133.

The computer-readable program instructions can include program instructions for interacting with web browser applications, such as web browser application 112, to determine whether the user device 110 has a digital wallet 111 installed thereon. The computer-readable program instructions also can include program instructions for attaching to a detected digital wallet 111 to exchange messages. In certain exemplary embodiments, the program instructions are configured to exchange messages with a digital wallet 111 embedded in an HTML5 compliant web browser 112. In an exemplary embodiment, the computer-readable program instructions comprise execute when the browser application 112 on the user device 110 downloads a web page from the merchant's website 133. The browser application 112 executes the code locally to search for an installed digital wallet 111 on the user device 110. If a digital wallet 111 is installed, then the browser is instructed to surface a wallet control button for selection by the user. If a digital wallet 111 is not installed, then the browser is instructed to surface another control for interaction with the user, such as an option to install a wallet application 111.

In block 310, the digital wallet 111 is installed on the user device 110. In certain exemplary embodiments, the user 101 can navigate to a website 133 of a provider of the digital wallet 111 and download and install the digital wallet 111. In certain exemplary embodiments, as discussed previously, a merchant's website 133 can prompt the user 101 to download and install the digital wallet 111, for example, upon selecting the "checkout" option on the merchant's website 133. In such an embodiment, the user 101 may provide payment information to the merchant's website 133 in a conventional manner and then download and install the digital wallet 111. The payment information provided to the merchant's website 133 can then be automatically stored in the digital wallet 111 installed on the user device 101. An exemplary method of installing a digital wallet 111 is discussed further in connection with FIG. 5.

In block 315, the user 101 navigates to the merchant's website 133 using the web browser application 112. In block 320, the user 101 browses the merchant's website 133 for one or more products to purchase. In block 325, the user 101 indicates a desire to purchase one or more products. For example, the user 101 may browse the merchant's website 133 and add products to a virtual shopping cart. Once the user 101 is ready to checkout, the user 101 can actuate a "checkout" link on the merchant's website 133.

In block 330, the merchant's website 133 presents a web page via the web browser application 112 for obtaining payment information from the user 101. This web page can include conventional payment options, such as a form for receiving payment information and contact information and/or a link to a third party payment processor. This web page also can include the computer-readable program instructions for detecting and interacting with the digital wallet 111. Furthermore, this web page can include a "pay with wallet" link or button that the user 101 can select to pay using the digital wallet 111.

In block 335, the merchant's website 133 interacts with the digital wallet 111 to complete the purchase of the products selected by the user 101. The merchant's website 133 can attach to the digital wallet 111 and send a purchase request message to the digital wallet 111. As discussed above, the purchase request message can include a request for payment information and further include information regarding the requested purchase, such as information associated with the selected products and information associated with the merchant system 130. In response to receiving the purchase request message, the digital wallet 111 can present a user interface to the user 101 for the user 101 to confirm the purchase. The user interface also can allow the user 101 to select from multiple payment options to send to the merchant's website 133. If the user 101 confirms the purchase, the digital wallet 111 sends a merchant request message including the confirmation and payment information associated with the payment option to the merchant's website 133. The payment processor 132 can interact with an acquirer or the financial institution associated with the payment information to authorize the purchase. Block 335 is discussed in further detail in connection with FIG. 4.

In block 340, the merchant's website 133 sends a message including a receipt to the digital wallet 111. The receipt can include information associated with the purchase, such as a list of products purchased, a description of each product purchased, the price for each product purchased, a product category for each product purchased, a total price, a stock keeping unit (SKU) or similar product identifier for each product purchased, taxes paid, rebates for one or more of the products purchased, payment method used, discounts applied, the time and/or date of purchase, warranty information for one or more of the products purchased, or other suitable information. The receipt also can include information regarding the merchant associated with the merchant system 130, including a name of the merchant, a description of the merchant, the URL of the merchant's website 133, and other suitable information regarding the merchant or the merchant system 130.

In block 345, the digital wallet 111 stores the receipt in the data storage unit 113. In an embodiment where the digital wallet 111 is embedded in an HTML5 compliant web browser application (or similar web browser application), the digital wallet 111 can employ the local storage functionality of the web browser application to store the receipt in the data storage unit 113.

In block 350, the digital wallet 111 synchronizes with the cloud computing environment 150 by sending the receipt to the web server 151. The web server 151, in turn, stores, in the data storage unit 152, the received receipt in the user's digital wallet account with the cloud computing environment 150. From step 350, the method 300 ends.

Figure 4:
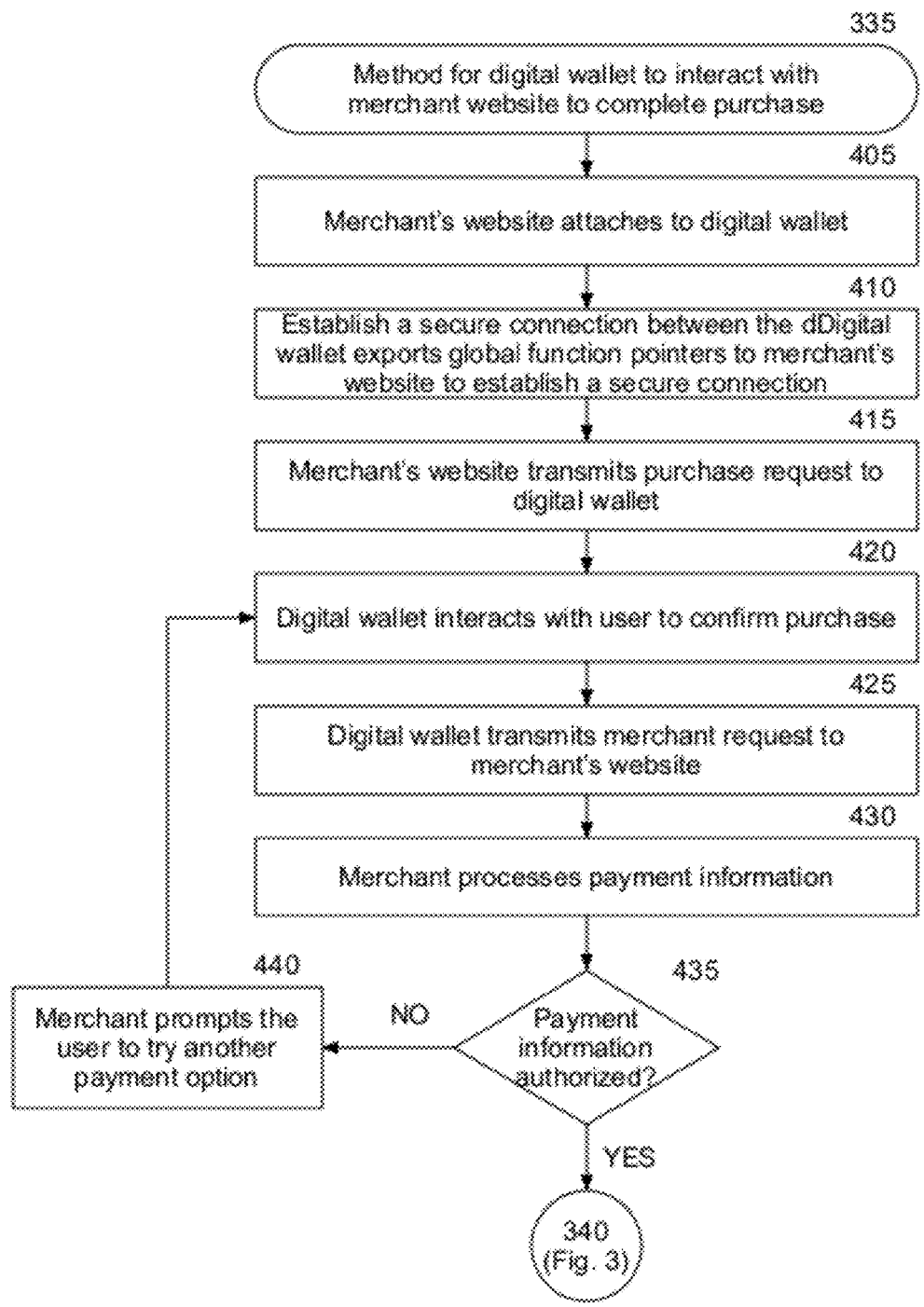
FIG. 4 is a flow chart depicting a method for a digital wallet to interact with a merchant website to complete a purchase, in accordance with certain exemplary embodiments.

FIG. 4 is a flow chart depicting a method 335 for a digital wallet to interact with a merchant website 133 to complete a purchase, in accordance with certain exemplary embodiments, as referenced in step 335 of FIG. 3. With reference to FIGS. 1 and 4, in block 405, the merchant's website 133 attaches to the digital wallet 111 by establishing a connection between the website 133 and the digital wallet 111.

In block 410, the digital wallet 111 and the merchant's website 133 establish a secure connection for communication between the digital wallet 111 and the merchant's website 133. In certain exemplary embodiments, the digital wallet 111 may authenticate the merchant's website 133 prior to establishing the secure connection. For example, the digital wallet 111 may compare the merchant name, the URL of the merchant's website 133, or the IP address of the merchant's website 133 to a list of known trusted or known non-trusted merchants prior to establishing the secure connection. If the merchant system 130 is not trusted by the digital wallet 111, then the digital wallet 111 will not authorize the secure connection, rather the digital wallet 111 detaches from the merchant's website 133 by disconnecting the connection between the website 133 and the digital wallet 111.

After establishing the secure connection, in block 415, the merchant's website 133 transmits a purchase request message to the digital wallet 111. The purchase request message includes a request for payment information from the digital wallet 111 to complete the purchase. The purchase request message also can include information regarding the product(s) for purchase, such as a name and/or description of each product, a price for each product, a total price for all products, taxes, shipping charges, handling charges, other charges, a SKU or other product identifier for each product, shipping options and associated costs, and/or a discount amount for each product. The purchase request message also can include information regarding the merchant, such as the merchant's name, a description of the merchant, and/or payment methods accepted by the merchant (for example, VISA, MASTERCARD, debit card, or other payment method). In certain exemplary embodiments, the purchase request message also can include a request for the user 101 to provide additional information. This request can be configured by the merchant to solicit additional information from the user 101, such as an e-mail address or a loyalty rewards account number.

In block 420, the digital wallet 111 receives the purchase request message from the merchant's website 133 and interacts with the user 101 to confirm the purchase. In certain exemplary embodiments, this interaction includes the digital wallet 111 presenting a user interface on the user device 110 that displays information associated with the purchase to the user 101 and requests confirmation to complete the purchase. The information displayed by the digital wallet 111 may include some or all of the information included in the purchase request message.

In certain exemplary embodiments, the user interface displayed by the digital wallet 111 also enables the user 101 to select from multiple payment options stored by the digital wallet 111. The user interface also may allow the user 101 to select or update shipping information. The digital wallet 111 may block the user from using a payment option not accepted by the merchant system 130 as indicated in the purchase request message. The user interface also may prompt the user 101 to enter information requested by the merchant system 130 in the purchase request message. After reviewing the purchase information and/or selecting a payment method, updating shipping information, and/or providing additional information, the user 101 actuates a link or button control to confirm the purchase. If the user 101 does not want to confirm the purchase, the user 101 selects a "cancel" link or button control to cancel the purchase, thereby terminating the session between the digital wallet 111 and the website 133.

In block 425, if the user 101 confirmed the purchase in block 420, the digital wallet 111 generates and transmits a merchant request message to the merchant's website 133. The merchant request message includes confirmation of the purchase and payment information to use in completing the purchase. For example, the merchant request message can include the form of payment and all information needed to process that payment (for example, credit card number), shipping method, shipping address, e-mail address, user name, and any other information for the purchase transaction. The merchant request message also can include the information in the purchase request message and any information requested by the merchant system 130. The digital wallet 111 can automatically retrieve payment information for a selected payment option from the data storage unit 113 to include in the merchant request message upon confirmation from the user 101 and/or a selection of a payment option by the user 101.

In block 430, the merchant's website 133 receives the merchant request message and sends the payment information to the payment processor 132 for processing. The payment processor 132 interacts with an acquirer or a financial institution associated with the payment information to authorize the payment information and to credit and debit the appropriate accounts for payment from the user 101 to the merchant.

In block 435, the web server 131 receives a message from the payment processor 132 indicating whether the payment information was authorized. If the payment information was authorized, the method 335 follows the "YES" branch to step 340, as referenced in FIG. 3. Otherwise, the method 335 follows the "NO" branch to step 440.

In step 440, the merchant's website 133 notifies the user 101 that the payment information was not authorized and can prompt the user 101 to try another payment option. After block 440, the method 335 returns to block 420 where the digital wallet 111 interacts with the user 101 to complete the purchase using a different payment option. The user 101 could cancel the purchase if the user 101 does not want to complete the purchase using a different payment option.

Figure 5:
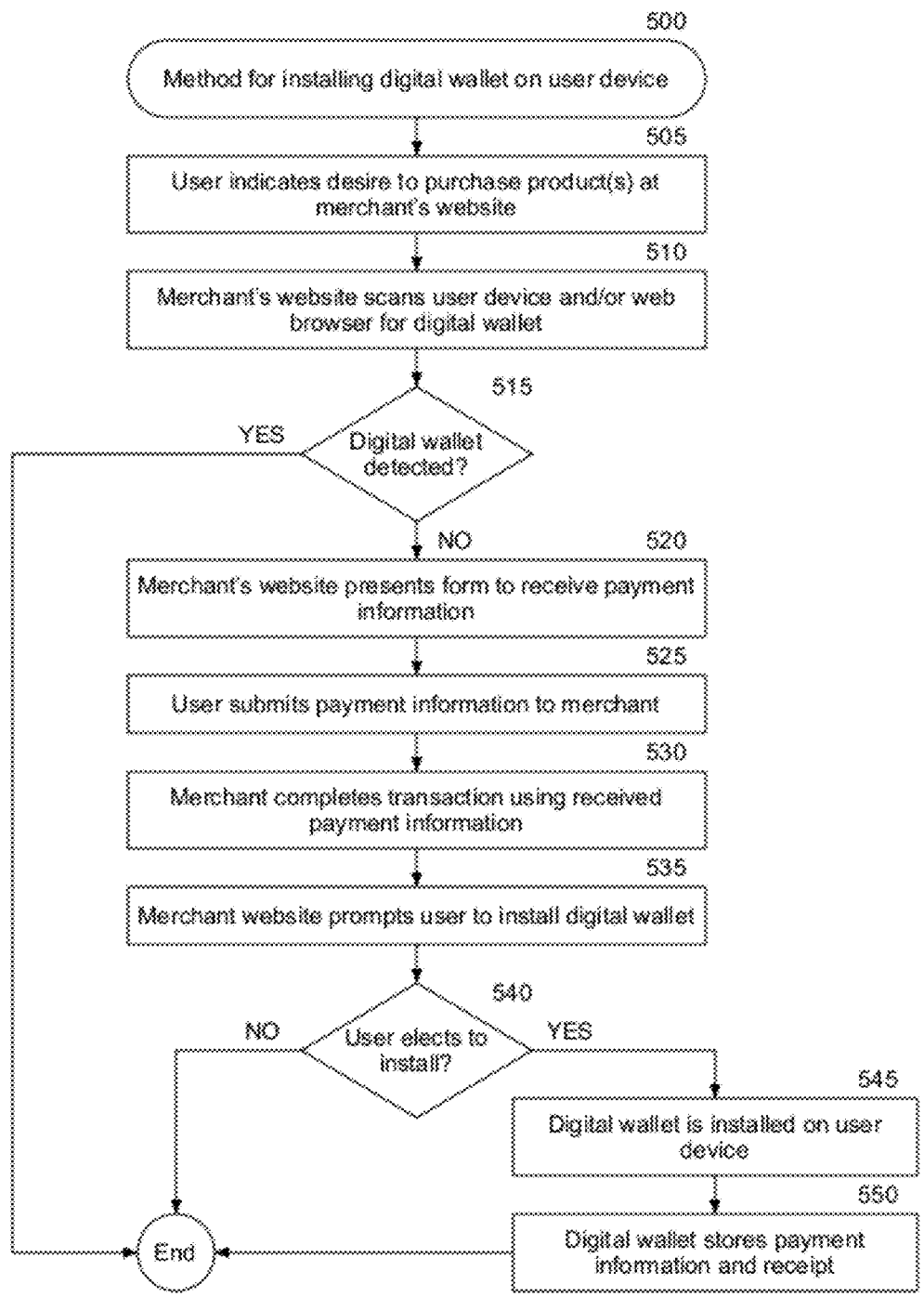
FIG. 5 is a flow chart depicting a method for installing a digital wallet on a user device, in accordance with certain exemplary embodiments.

FIG. 5 is a flow chart depicting a method 500 for installing a digital wallet on a user device, in accordance with certain exemplary embodiments. With reference to FIGS. 1 and 5, in block 505, the user 101 indicates a desire to purchase one or more products at the merchant's website 133. This act performed in block 505 can be substantially similar to steps 315-325 illustrated in FIG. 3 and discussed above.

In block 510, the merchant's website 133 scans the user device 110 and/or the web browser application 112 to determine whether a digital wallet 111 is installed on the user device 110 or embedded in the web browser application 112. In block 515, if the merchant's website 133 detects a digital wallet 111, then the method 500 follows the "YES" branch and ends as a digital wallet 111 is already installed on the user device 110. If a digital wallet 111 is not detected by the merchant's website 133, the method 500 follows the "NO" branch to block 520.

In block 520, the merchant's website 133 presents a form for the user 101 to provide payment information to complete the purchase of the one or more products. This form can be similar to a conventional web form having text entry fields for receiving credit card, debit card, or other payment information, shipping address, billing address, e-mail address, name, phone number, and other user information. The form also can include fields for receiving user information and user contact information.

In block 525, the user 101 completes the form by providing the requested information and submits the form to the merchant's website 133. In block 530, the merchant system 130 processes the received payment information and completes the transaction. In block 535, the merchant's website 133 prompts the user 101 to download and install the digital wallet 111 on the user device 110.

In block 540, if the user 101 elects to install the digital wallet 111, the method 500 follows the "YES" branch to block 550. Otherwise, the method 500 follows the "NO" branch and the method 500 ends.

In block 545, the merchant's website 133 downloads and initiates the installation of the digital wallet 111 on the user device 110. During the installation process, the digital wallet 111 can prompt the user 101 to set up a digital wallet account at the cloud computing environment. The user 101 can opt-in or opt-out of this feature and also can select to install or activate certain features only. If the user 101 opts-in to the digital wallet account, the digital wallet 111 can obtain information from the user 101 for the account, such as payment information, contact information, preferred shipping information, and a user name and password for security purposes.

The installed digital wallet 111 can interact with the merchant's website 133 to obtain the payment information used to complete the purchase and a receipt for the purchase. In block 550, the digital wallet 111 stores the payment information and the receipt in the data storage unit 113. If the user 101 elected to create a digital wallet account with the cloud computing environment, the digital wallet 111 synchronizes the receipt and the payment information with the digital wallet account.

In an alternative exemplary embodiment, the installation of the digital wallet 111 on user device 110 can occur prior to step 520, whereby the user downloads the digital wallet application 111, provides the payment and user information for storage by the digital wallet 111 on the date storage unit 113, and then completes the purchase with the website 133 via the digital wallet 111.

General

The exemplary embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method to process online payment transactions without navigating from a merchant website displayed by a web browser application on a user interface of a user computing device, comprising:
    storing, by a digital wallet module on the user computing device, known merchant data;
    displaying, by a web browser application of a user computing device, a merchant website on a user interface of the user computing device, the merchant website comprising a display of goods available for purchase from a merchant;
    receiving, by the user computing device and from the merchant website, a notification that an online payment transaction to purchase goods displayed on the merchant website has been requested;
    receiving by the digital wallet module on the user computing device, merchant website data;
    comparing, by the digital wallet module on the user computer device, the received merchant website data to the stored known merchant data;
    determining, by the digital wallet module on the user computing device, the merchant website is authentic prior to establishing a secure connection between the merchant website and digital wallet module on the user computing device;
    based on a determination that the merchant website is authentic, establishing a secure connection between the merchant website and a digital wallet module on the user computing device;
    receiving, by the digital wallet module on the user computing device and from the merchant website via the secure connection, a request for payment information without navigating from the merchant website displayed on the user interface of the user computing device; and
    transmitting, by the digital wallet module on the user computing device via the secure connection, the payment information to the merchant website without navigating from the merchant website displayed on the user interface of the user computing device.

2. The computer-implemented method of claim 1, wherein the digital wallet module is embedded in the web browser application on the user computing device.

3. The computer-implemented method of claim 1, wherein the user computing device is a mobile telephone.

4. The computer-implemented method of claim 1, wherein the request for payment information comprises information associated with the online payment transaction, and wherein the digital wallet module saves at least a portion of the information associated with the online payment transaction.

5. The computer-implemented method of claim 4, wherein the information associated with the online payment transaction comprises at least one of a total price for the transaction, a description of a product or service being purchased, and forms of payment accepted by the merchant.

6. The computer-implemented method of claim 1, further comprising:
    displaying, by the digital wallet module on the user computing device, a user interface object for the user to select one of a plurality of payment options stored by the digital wallet module; and
    receiving, by the digital wallet module on the user computing device, a user's selection of one of the plurality of payment options, wherein the payment information received from the digital wallet module corresponds to the selected one payment option.

7. The computer-implemented method of claim 1, further comprising:
    receiving, by the digital wallet module on the user computing device, a receipt for the transaction; and
    storing, by the digital wallet module on the user computing device, the receipt.

8. A non-transitory computer-readable medium having computer-readable program instructions embodied therein that when executed by a computing device cause the computing device to process online payment transactions without navigating from a merchant website displayed by a web browser application on a user interface of the computing device and to cause the computing device to perform the following steps:
    storing, by a digital wallet module on the computing device, known merchant data;
    displaying, by a web browser application of a computing device, a merchant website on a user interface of the computing device, the merchant website comprising a display of goods available for purchase from a merchant;
    receiving, from the merchant website, a notification that an online payment transaction to purchase goods displayed on the merchant website has been requested;
    receiving, by the digital wallet module on the computing device, merchant website data;
    comparing, by the digital wallet module on the user computing device, the received merchant website data to the stored known merchant data;
    determining, by the digital wallet module on the computing device, the merchant website is authentic prior to establishing a secure connection between the merchant website and the diaital wallet module on the computing device;
    establishing a secure connection between the merchant website and the digital wallet module on the computing device, based on a determination that the merchant website is authentic;
    receiving, by the digital wallet module on the computing device and from the merchant website via the secure connection, a request for payment information without navigating from the merchant website displayed on the user interface of the computing device; and
    transmitting by the digital wallet module on the computing device via the secure connection, the payment information to the merchant website without navigating from the merchant website displayed on the user interface of the computing device.

9. The non-transitory computer readable medium of claim 8, wherein the digital wallet module is embedded in the web browser application on the computing device.

10. The non-transitory computer readable medium of claim 8, wherein the computing device is a mobile telephone.

11. The non-transitory computer readable medium of claim 8, wherein the request for payment information comprises information associated with the online financial transaction, and further comprising computer-readable program instructions to save at least a portion of the information associated with the online financial transaction.

12. The non-transitory computer readable medium of claim 11, wherein the information associated with the online financial transaction comprises at least one of a total price for the transaction, a description of a product or service being purchased, and forms of payment accepted by the merchant.

13. The computer-implemented method of claim 1, wherein the computing device comprises a computer.

14. The computer-implemented method of claim 1, wherein the merchant system comprises a web server that operates the merchant website displayed on the user interface of the user computing device.

15. The computer-implemented method of claim 1, further comprising:
submitting, by a merchant computing system, a payment authorization request to a financial institution to fund the payment transaction, wherein the financial institution corresponds to the payment information received from the digital wallet module on the user computing device;
receiving, by the merchant computing system and from the financial institution, a payment authorization in response to the payment authorization request authorizing payment in accordance with the payment information;
authorizing, by the merchant computing system, the payment transaction in response to receiving the payment authorization; and
transmitting, by the merchant computing system, confirmation of an authorized payment transaction to the digital wallet module on the user computing device.

16. The non-transitory computer readable medium of claim 8, wherein the computing device comprises a computer.

17. The non-transitory computer readable medium of claim 8, further comprising computer-readable program instructions to communication, in response to receiving the notification from the merchant website, with the merchant website to determine that the computing device comprises the digital wallet module.

18. A system for completing financial transactions, comprising:
a storage device;
a processor, the processor communicatively coupled to the storage device, containing application code instructions, wherein the processor executes the application code instructions that are stored in the storage device to cause the processor to perform the steps of:
storing known merchant data;
displaying a merchant website on a user interface of the user computing device, the merchant website comprising a display of goods available for purchase from a merchant;
receiving a notification that an online payment transaction to purchase goods displayed on the merchant website has been requested;
receiving merchant website data;
comparing the received merchant website data to the stored known merchant data;
determining that the merchant website is authentic prior to establishing a secure connection between the merchant website and digital wallet module on the user computing device;
based on a determination that the merchant website is authentic, establishing a secure connection between the merchant website and a digital wallet module on the user computing device;
receiving a request for payment information without navigating from the merchant website displayed on the user interface of the user computing device; and
transmitting by the digital wallet module on the user computing device via the secure connection, the payment information to the merchant website without navigating from the merchant website displayed on the user interface of the user computing device.

19. The system of claim 18, wherein the request for payment information comprises information associated with the online payment transaction.

20. The system of claim 19, wherein the information associated with the online payment transaction comprises at least one of a total price for the transaction, a description of a product or service being purchased, and forms of payment accepted by the merchant.

21. The system of claim 18, wherein a merchant computing system comprises a web server that operates the merchant website displayed on the user interface of the computing device.

22. The system of claim 18, further comprising a merchant computing system, wherein the merchant computing system comprises a merchant storage device and a merchant processor communicatively coupled to the merchant storage device, and wherein the merchant processor executes application code instructions that are stored in the merchant storage device to cause the merchant processor to perform the steps of:
submitting a payment authorization request to a financial institution to fund the online payment transaction, wherein the financial institution corresponds to the payment information received from the digital wallet module on the computing device; and
receiving, from the financial institution, a payment authorization.

23. The system of claim 18, wherein the merchant processor execute computer-readable instructions stored in the merchant storage device to cause the merchant system to perform the steps of:
receiving the payment authorization;
authorizing the online payment transaction; and
transmitting confirmation of an authorized online payment transaction to the digital wallet module on the computing device.

24. The system of claim of 18, wherein the processor execute computer-readable instructions stored in the storage device to cause the system to perform the step of:
receiving a notification from the merchant website that an online payment transaction to purchase goods displayed on the merchant website has been requested.

* * * * *

UNITED STATES PATENT AND TRADEMARK OFFICE
CERTIFICATE OF CORRECTION

PATENT NO. : 9,691,055 B2  
APPLICATION NO. : 13/277182  
DATED : June 27, 2017  
INVENTOR(S) : Rob von Behren and Jonathan Wall Page 1 of 1

It is certified that error appears in the above-identified patent and that said Letters Patent is hereby corrected as shown below:

In the Claims

Column 18, Claim 8, Line 52 should read "--website and the digital wallet module on the computing--"

Column 20, Claim 23, Line 51 should read "--processor is further configured to execute computer-readable instructions stored in the--"

Column 20, Claim 24, Line 60 should read "--is further configured to execute computer-readable instructions stored in the storage--"

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*